Nov. 3, 1970    J. R. CALLANAN    3,537,699
JIG FOR ELECTRICAL OUTLET BOX MOUNTING
Filed Nov. 1, 1968                            2 Sheets-Sheet 1

INVENTOR.
JOSEPH R. CALLANAN

BY
Curtis, Morris & Safford
ATTORNEYS

Nov. 3, 1970 J. R. CALLANAN 3,537,699
JIG FOR ELECTRICAL OUTLET BOX MOUNTING
Filed Nov. 1, 1968 2 Sheets-Sheet 2
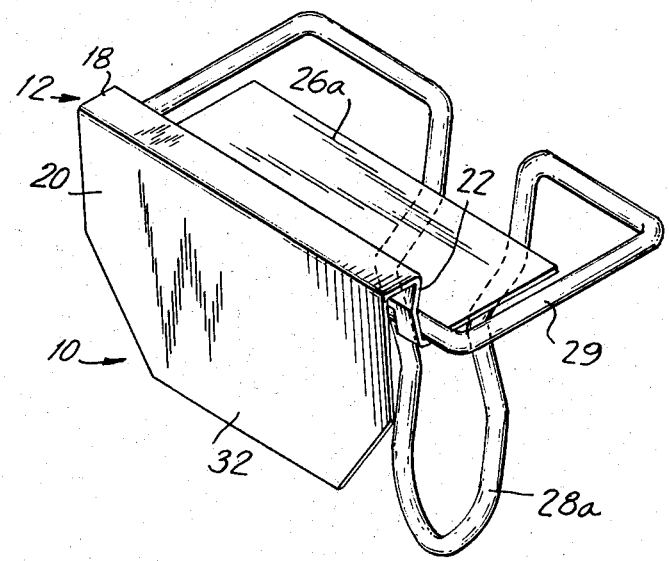
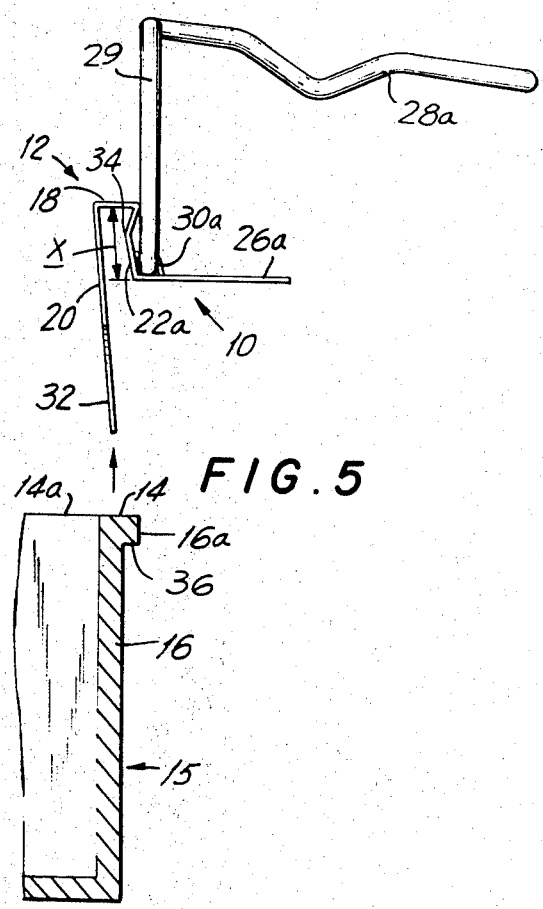
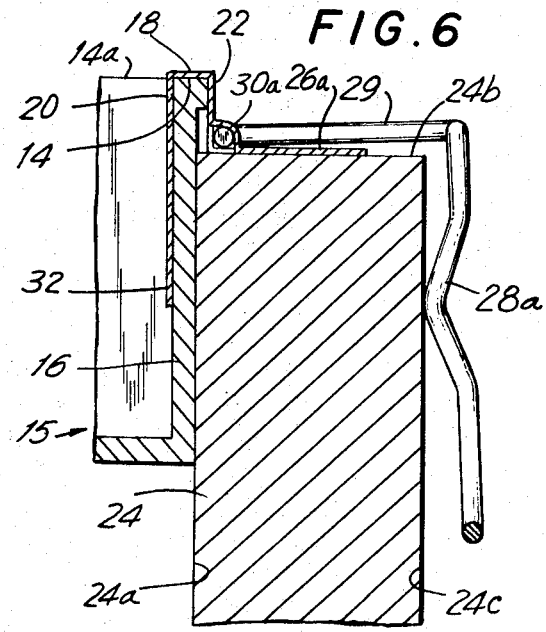
INVENTOR.
JOSEPH R. CALLANAN United States Patent Office 3,537,699
Patented Nov. 3, 1970

3,537,699
JIG FOR ELECTRICAL OUTLET BOX MOUNTING
Joseph R. Callanan, Whitman, Mass., assignor to
Cal-Tav, Inc., Cambridge, Mass.
Filed Nov. 1, 1968, Ser. No. 772,567
Int. Cl. B25b 5/04
U.S. Cl. 269—98                   10 Claims

ABSTRACT OF THE DISCLOSURE

A jig for mounting electrical outlet boxes to building wall and ceiling members having a three-sided open loop section adapted to grasp a wall of an outlet box, an alignment arm section extending from the loop section to align the box and jig on a building member, and a leg member section extending from adjacent the arm section to hold the jig and box on a building member.

---

This invention relates to a device for mounting electrical outlet boxes, and more particularly to a sturdy, inexpensive, re-usable jig that quickly and easily can be slipped onto an electrical outlet box with which it can be mounted on a stud or joist of a building under construction to align the box accurately for securing the box to the stud or joist, and then readily can be removed from the box and building member.

Outlet boxes ordinarily are mounted in new buildings, for example houses, on wall studs or ceiling joists over which a lath and plaster or a dry-wall construction is placed to form the interior walls and ceilings. The open end of the box, into which later is placed a fixture, receptacle or switch, must extend outwardly from the stud or joist an amount about equal to the wall or ceiling thickness so that the exposed portion of the box will be flush with the wall or ceiling. Also, the box must be aligned vertically or horizontally so the edges of the opening project an equal distance from the front face of the stud or joist.

Hand mounting of electrical boxes is difficult and time consuming because at least one hand must be used to hold the box as it is secured, e.g., by nails, to a building member. The box often slips, or inadvertently is moved by the worker's hand, and is misaligned. A house might have as many as twenty or more electrical outlets, so that the time involved properly to hand mount the outlet boxes, and to re-mount misaligned ones, is considerable.

Numerous devices have been created to align or to hold and align electrical outlet boxes as they are secured to building members. Many such devices have been patented, for example, in U.S. Pats. No. 2,802,634, No. 2,990,172 and No. 3,154,304. In general, however, the previous devices have serious shortcomings. Some are permanently affixed to the box, stud or joist, and thus are not re-usable. Others are of relatively complex construction, having a multiplicity of parts many of which are movable, and thus are both expensive to make and very subject to wear and breakage.

It is an object of this invention to provide an improved jig for electrical outlet box mounting. Another object of this invention is to provide an outlet box mounting jig that is readily attached to the box, simple to place on a stud or joist, accurately and positively aligns and holds the box against the stud or joist, and is easily removed from both the box and building member for re-use, all in a comparatively short amout of time. A further object of this invention is to provide a jig of the type described that has a relatively simple design and construction, without a multiplicity of parts, particularly moving parts. These and other objects of this invention will be in part discussed in, and in part apparent from, the following more detailed disclosure.

The present invention can be understood more thoroughly by reference to the accompanying drawings, in which like reference numerals identify corresponding elements, and in which:

FIG. 4 is a perspective and shows another embodiment of an electrical outlet box mounting jig according to this invention;

FIG. 5 is a section and shows the jig of FIG. 4 and its relation to an outlet box; and FIG. 6 is a section and shows an outlet box mounted and aligned on a building member by the jig of FIG. 4.

Figure 1:
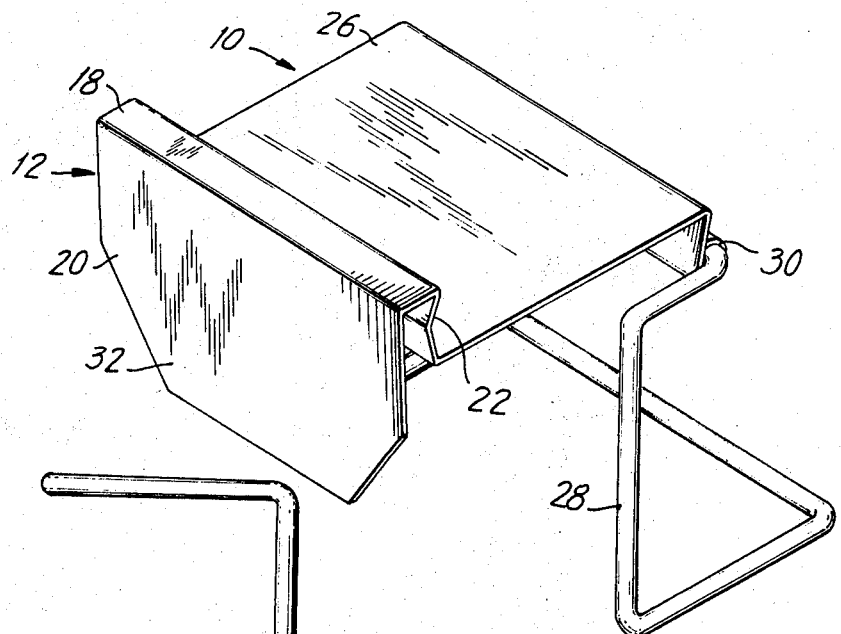
FIG. 1 is a perspective and shows an embodiment of an electrical outlet box mounting jig according to this invention.

Broadly, a jig 10 according to this invention has an open loop section 12 that is adapted to extend over and embrace an edge 14 of one side wall 16 of an electrical outlet box 15 (partially shown in the drawings). The open loop 12 of the jig 10 is pressed over the wall edge 16 until the closed end 18 of the loop is uniformly against the edge 14. The sides 20, 22 of the open loop 12 press against the sides of the wall 16 and firmly hold the box 15. The loop 12 fits over the wall edge 14 an amount X equal to the distance the outlet box 15 is to project out from the face 24b of a building member 24, i.e., the thickness of the interior wall or ceiling construction to be placed on a stud or joist.

Extending from one side 22 of the open loop section 12 is an alignment arm 26. The plane of the arm is substantially parallel to the plane of the closed end 18 of the loop 12. To align a box 15 on a building member, the box is placed against one side 24a of a stud or joist 24 and the alignment arm 26 of the jig is pushed flush against the outer face 24b of the stud or joist. Thus the periphery 14, 14a of the open end of the box uniformly projects the desired distance X beyond the building member, and the box is accurately and positively aligned for mounting.

To hold an aligned box 15 against a stud or joist 24 during mounting, a leg member 28 extends from adjacent the arm 26 at an end thereof. The leg member 28 serves to apply pressure against the side 24c of the building member opposite the side wall 16 of the box 15, and thus, in effect, to clamp the box 15 and jig 10 to the building member. Mounted in that fashion, the outlet box can be fastened to a stud or joist without having to hold the box by hand.

The leg member 28 is pivotally mounted so that it can be swung into holding position (FIGS. 3 and 6) against face 24c of the building member 24 after the jig 10 and the box 15 held thereby are aligned against faces 24a and 24b. In the embodiment illustrated in FIGS. 1, 2 and 3, leg member 28 is pivotally mounted by any convenient means 30 adjacent the end of the alignment arm 26 opposite the open loop section 12. In the embodiment illustrated in FIGS. 4, 5 and 6, leg member 28a is similarly mounted from an extension 29 by means 30a adjacent the end of alignment arm 26a attached to open loop section 12. In each instance the leg member 28, 28a and pivot means 30, 30a are located in a manner such that in the holding position, FIGS. 3 and 6, the leg member is in a stressed or distended condition locked and bearing against the building member face 24c to hold the jig 10 and box 15 firmly in place. A feature of the invention is that, although the leg members 28, 28a are illustrated as a continuous shaped rod or wire, preferably of spring steel or the like, the leg member can be formed from a sheet of resiliently flexible material, such as spring steel or a synthetic plastic having similar properties.

For ease of placing the open loop section 12 over the side wall edge 14 of the box 15, a tab section 32 optionally extends from the side wall 20 of the loop 12 opposite the arm 26. The tab section 32 also serves to prevent any tendency of the box 15 to rotate, in the loop 12, away from the building member 24, and thus is a desirable feature of the instant jigs.

Figure 3:
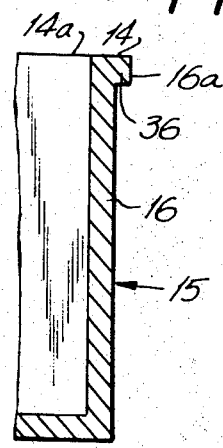
FIG. 3 is a section and shows an outlet box mounted and aligned on a building member by the jig of FIG. 1.
Figure 3:
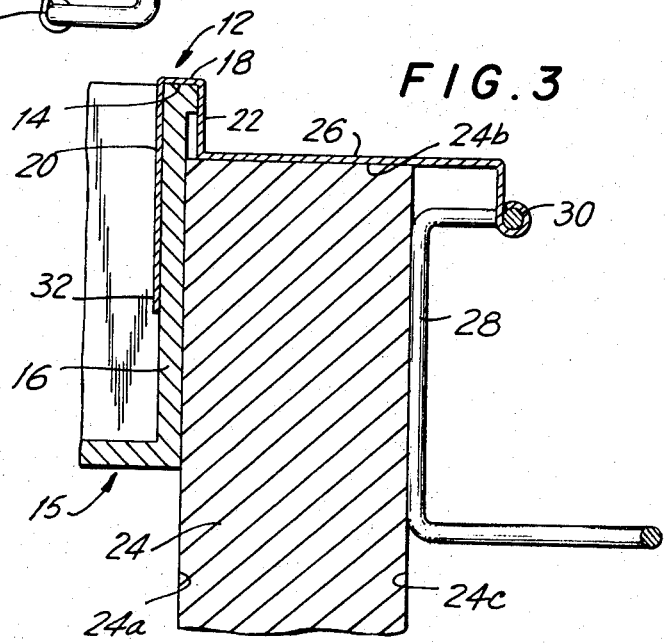

FIGS. 3 and 6 illustrate the profile of a jig 10 on a box and a building member, in what can be called a distended holding condition. One end of the side wall 22 of the open loop 12 tends to close in toward the other side wall 20. Inasmuch as the jig 10 is made of a resiliently flexible material, for example, a spring steel or a synthetic plastic having similar properties, the side walls 20, 22 of the loop are spread apart to receive the edge 14 of the box wall 16 and, in that operative condition, exert a pressure against the box wall to hold the box 15 firmly. Similarly, as previously mentioned, the leg member 28, 28a in the holding position tends to close toward the loop 12. Thus, as it is swung to the holding position it spreads outwardly and exerts a pressure against a stud or joist 24 to hold the jig 10 and the box 15 firmly until the box is fastened. Thereafter the jig is quickly and easily removed by grasping the loop 12 and pulling the jig off both the stud and box, with or without first swinging the leg member away from the stud or joist.

Figure 2:
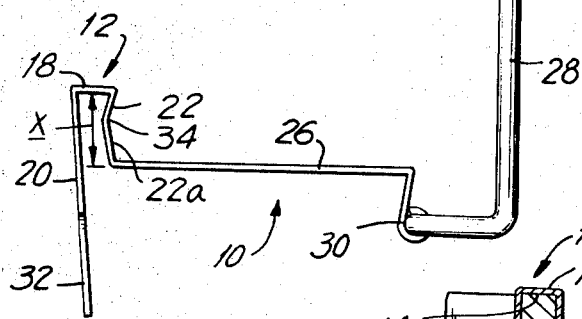
FIG. 2 is a section and shows the jig of FIG. 1 and its relation to an outlet box.

A feature of a preferred embodiment of the invention also is illustrated in FIGS. 2 and 5. The side wall 22 of the open loop section 12 attached to the arm section 26, and adapted to bear against the exterior face 16a of the wall 16 of an outlet box, has at the end adjacent the arm 26 a portion 22a turned away from the opposite wall 20 of the loop. The line of the turn, or bend 34, in the wall corresponds to a lip 36 around the periphery 14, 14a of the opening of many outlet boxes. The lip 36 reinforces the opening, especially of boxes made of relatively brittle material, such as Bakelite. As the loop 12 is passed over the edge 14 of the box 15, and the line of the turn 34 in the side wall 22 passes beyond the lip 36, the box tends to snap into place in the loop. The snapping movement usually is accompanied by a distinct sound, often a musical sound if the jig is made of a metal such as steel. The snap movement and the sound signal positively that the box 15 is firmly and properly mounted in the jig 10.

It is of course to be understood that numerous changes can be made in the design and structure of the jigs of this invention without departing from the scope of the invention as disclosed herein before and as defined in the following claims.

I claim:

1. A jig for mounting electrical outlet boxes which comprises: an open loop section having a closed end, a first side wall extending from one side of said closed end, and a second side wall extending from the opposite side of said closed end, said open loop being adapted to fit over an edge of and to bear firmly against a side wall of an electrical outlet box to hold said box in said jig; an alignment arm extending laterally outward from one of said side walls of said open loop section and being adapted to bear against the face of a building member to which said outlet box is to be fastened; and a leg member pivotally secured adjacent an end of said alignment arm swingable to a holding position in the direction of the open end of said open loop section, said leg member in said holding position being adapted to lock and bear firmly against said building member on the side thereof opposite an outlet box mounted in said jig and to hold said jig and said box onto said building member.

2. A jig for mounting electrical outlet boxes according to claim 1 wherein said open loop section and said alignment arm are a single piece of a flexible resilient material bent to form said section and said arm, and said leg member is a single sheet or strip of a flexible resilient material bent to form said member.

3. A jig for mounting electrical outlet boxes according to claim 2 wherein said flexible resilient material is a metal.

4. A jig for mounting electrical outlet boxes according to claim 2 wherein said flexible resilient material is steel.

5. A jig for mounting electrical outlet boxes according to claim 1 where said second side wall of said open loop section extends from the closed end thereof an amount substantially equal to a predetermined distance said outlet box is to project out from said building member, and said alignment arm extends from adjacent the end of said second side wall.

6. A jig for mounting electrical outlet boxes according to claim 1 wherein said first and second side walls of said open loop section, in an undistended condition, are closer together at the open end of said loop than adjacent said closed end thereof.

7. A jig for mounting electrical outlet boxes according to claim 1 wherein said leg member is pivotally secured adjacent the end of said alignment arm opposite said open loop section.

8. A jig for mounting electrical outlet boxes according to claim 1 wherein said leg member is pivotally secured adjacent the end of said alignment arm attached to said open loop section.

9. A jig for mounting electrical outlet boxes according to claim 1 wherein a first portion of the side wall of said open loop section from which said alignment arm extends is, in an undistended condition, at less than a right angle to said closed end of said loop, and a second portion of said side wall is at an angle to said first portion away from the other of said side walls.

10. A jig for mounting electrical outlet boxes according to claim 1 which further comprises a tab section extending from the side wall of said open loop section opposite said alignment arm substantially in the plane of said side wall.

References Cited

UNITED STATES PATENTS 2,956,798   10/1960   Briggs.
3,434,686   3/1969   Yoshizaburo Aoi __ 211—45 XR
2,637,128   5/1953   Weeks.

ROBERT C. RIORDON, Primary Examiner

D. D. EVENSON, Assistant Examiner

U.S. Cl. X.R.

220—3.6; 248—37